United States Patent [19]

May

[11] 4,294,207
[45] Oct. 13, 1981

[54] EXTERNALLY IGNITED, FOUR-CYCLE, PISTON-TYPE INTERNAL COMBUSTION ENGINE

[76] Inventor: Michael G. May, Bel Air, Ch-1180 Rolle, Switzerland

[21] Appl. No.: 143,586

[22] Filed: Apr. 25, 1980

[30] Foreign Application Priority Data

Aug. 28, 1979 [DE] Fed. Rep. of Germany ....... 2934644

[51] Int. Cl.³ .......................... F02B 3/00; F02B 23/00
[52] U.S. Cl. ................................. 123/279; 123/661; 123/306; 123/308
[58] Field of Search .............. 123/279, 263, 306, 308, 123/661, 671

[56] References Cited

U.S. PATENT DOCUMENTS

| | | | |
|---|---|---|---|
| 4,000,722 | 1/1977 | May | 123/281 X |
| 4,026,250 | 5/1977 | Funiciello | 123/262 X |
| 4,036,202 | 7/1977 | Weslake | 123/279 |
| 4,094,272 | 6/1978 | May | 123/309 |

FOREIGN PATENT DOCUMENTS 504440 4/1953 Italy ..................... 123/661

*Primary Examiner*—Ronald B. Cox
*Attorney, Agent, or Firm*—Edwin E. Greigg

[57] ABSTRACT

An internal combustion engine having intake and exhaust valves and a companion piston therefor in a cylinder block is proposed, the piston being provided with several depressions of varying depth and area and interconnected by a guide groove to control flow of the gaseous mixture from one depression to another. A first of the depressions in the piston is located at a distance from the longitudinal axis of the piston and one of the valves has a flat face which is substantially received in the depression. The other depression in the piston also has an axis that is spaced from the longitudinal axis of the piston with the guide groove which communicates with the first depression having a mouth that extends substantially tangentially into said second depression so that the vortex gaseous flow rotates approximately parallel to said piston top about the central longitudinal axis of the second depression toward the end of the compression stroke. It is also contemplated that the first depression can be disposed in the cylinder head with the inlet valve being received in the base of the depression.

34 Claims, 6 Drawing Figures

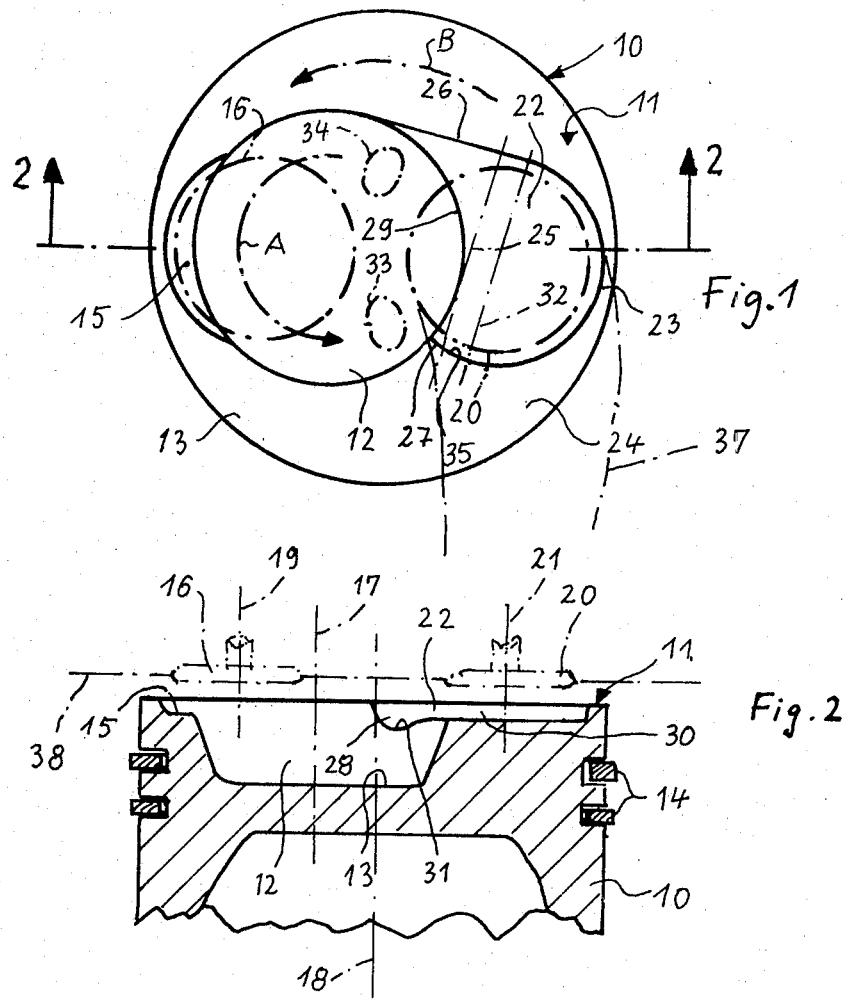

EXTERNALLY IGNITED, FOUR-CYCLE, PISTON-TYPE INTERNAL COMBUSTION ENGINE

CROSS REFERENCE TO RELATED PENDING APPLICATIONS AND RELATED PRIOR ART

There are no patents or printed publications having a bearing on the patentability of the present invention, but of interest are the following copending applications:

May, Michael G., U.S. application Ser. No. 143,408, filed Apr. 25, 1980, Group 342, "Auto-Igniting, Four Cycle, Piston."

May, Michael G., U.S. application Ser. No. 124,889, Filed Feb. 26, 1980, Group 342, "Internal Combustion Engine."

None of these above, whether taken and viewed singly or in combinatin with each other, are believed to have a bearing on the patentability of any claim of this invention.

BACKGROUND OF THE INVENTION

The invention relates to an externally ignited, four-cycle, piston-type internal combustion engine. Engines of this type are also known as Otto engines.

In a known internal combustion engine of this type (German Democratic Republic Patent No. 91,936), a cylindrical depression is disposed in the center of the piston, coaxial with its longitudinal axis, and openings directed diagonally downward from the piston top lead into this depression, the openings being inclined in such a manner that the gas jets flowing through them into the depression, toward the end of the compression stroke are intended to generate in the depression a vortex flow running approximately parallel to the piston top. The high flow losses of the gas or mixture flows which pass through the openings are disadvantageous. Furthermore, toward the end of the compression stroke, the mixture also flows in substantial quantities axially and radially into the depression approximately radially from all sides and this action hinders the formation of an effective vortex flow in the depression. It is not possible to attain high compressions of the mixture. Combustion also takes place relatively slowly in such an engine, with the result that a substantial quantity, in percentage terms, of harmful, partially combusted components is emitted.

OBJECTS AND SUMMARY OF THE INVENTION

It is accordingly an object of the invention to create an externally ignited, four-cycle, piston-type internal combustion engine which enables very high compressions of the mixture and thus a high level of thermal effectiveness, while even with normal fuels having an octane rating, for example, of 91, very high compressions are still to be attained. Also, the fuel-air mixture is intended to be capable of being burned very rapidly with a substantial air excess and/or with the admixture of recirculated exhaust gas.

As a result of this four-cycle, piston-type internal combustion engine in accordance with the invention, an extraordinarily complete combustion of the fuel-air mixture occurs in the combustion chamber of the cylinder or of each of its cylinders, because the shallow, broad guide groove brings about an effective vortex flow in the depression toward the end of the compression stroke, this vortex flow being arranged to rotate substantially parallel to the piston top and thus substantially promoting combustion. Also, fuel-air mixtures having a substantial air excess can be combusted up to high compressions without knocking or misfiring.

The air excess of the mixture may preferably amount to 10 to 40%, preferably 20 to 30%, and/or recirculated exhaust gas can also be admixed advantageously with the fuel-air mixture in substantial, even anomalously large, percentages.

This engine in accordance with the invention, because of its favorable properties, also has a low specific fuel consumption, particularly in the partial-load range, so that it can operate very economically. Because of the very rapid combustion, only relatively small amounts of harmful components, such as carbon monoxide and hydrocarbons, are formed.

Because the depression is cut into the piston top, there are, among others, substantial advantages for the cylinder head, because it can be formed with a lower structural height and its cooling is simplified. If, in addition, as is preferred, the guide groove is provided exclusively in the piston top and not in the cylinder head, the design of the cylinder head and its manufacture are simplified still further. It is also possible in many cases, however, that the guide groove be provided only in the cylinder head, or that one guide groove each be provided both in the cylinder head and in the piston top. In that event, the volume of the individual guide groove is correspondingly less, so that the two guide grooves taken together have approximately the same volume as does the one guide groove in the event that only a single guide groove is present. However, it is preferable to provide the guide groove in the piston top.

The invention also enables the problem-free conversion, with relatively little expense, of the mass production of internal combustion engines having known depression-equipped pistons to mass production with the depression-equipped piston in accordance with the invention. It even permits engines which have already been manufactured, and which in some cases are already in operation, to be equipped subsequently with the new depression-equipped piston. It is preferable that, in the top dead center position of the piston, the volume of the depression be at least 60% and preferably from 70 to 80% of the combustion chamber volume then available.

It has proved to be particularly suitable when the guide groove is not only long but is also quite broad. Because the central longitudinal axis of the depression is located at a distance from the central longitudinal axis of the piston, and the guide groove is located opposite an indentation in the cylinder head required for the valve plate, or when this indentation is entirely or in part formed by the guide groove, then despite the relatively great suitable breadth of the guide groove, there are still large "squeezing" surfaces at either side of the guide groove, which toward the end of the compression stroke direct squeeze flows into the guide groove which then flow toward the depression in the longitudinal direction of the guide groove and generate in the depression a vortex flow which is extremely effective for combustion. The valve plate of the other gas exchange valve is then located either entirely or substantially above the depression, so that the indentation in the piston top required for this gas exchange valve can be formed at least partially by the depression and thus the total squeezing surface of the piston top is both particularly large and also particularly favorable in form and position for the generation of the vortex flow in the depression. The "squeezing" surface or surfaces of the piston top are understood as those surface areas which, in the top dead center position of the piston, are at a very small distance from one another, i.e., a distance which is normally as small as possible and amounts to approximately 1 mm, for example. The term "squeezing zone" is understood to be the minimum zone between this squeezing surface and the squeezing surface of the cylinder head opposite it.

The squeezing surface of the piston could actually be still further enlarged, if the guide groove is embodied as narrow rather than broad; however, then the mixture quantity which flows through the guide groove becomes smaller and advances at a slower rate, and if it is desired to enlarge the cross section by deepening the guide groove, then the flow is slowed down still further. It is known to guide the gas supply channel, which can be closed off by the inlet valve and which leads into the particular cylinder, toward the combustion chamber of this cylinder in such a fashion that the gas flow through it into the combustion chamber rotates about the longitudinal axis of the cylinder as a vortex flow. In order that this vortex flow does not disturb the vortex flow being formed in the depression but rather reinforces it, it is suitable that the vortex direction of the gas flow, effected by the gas which overflows out of the guide groove into the depression, enters the depression in the same direction as the above-described vortex flow.

In a preferred embodiment, the cross-section of the guide groove, in that longitudinal portion which begins at the cross-sectional plane determined by the central longitudinal axis of the valve plate located above the guide groove and which extends up to the depression, changes little in the direction of the depression and enlarges by a maximum of 30% with respect to the cross section in the plane determined by the central longitudinal axis of the particular gas exchange valve, and preferably by less than 20%.

Preferred fields of application of the invention are vehicle engines, such as automobile, boat or airplane engines.

In an internal combustion engine which has one or more cylinders, where the displacement of the cylinder, or of each cylinder, amounts to 200 to 700 cm$^3$, the depth of the guide groove below the valve plate located above it can amount to from 1 to 4 mm and preferably 2 to 3 mm. The maximum depth of the guide groove in the downstream direction may suitably increase up to 3 to 9 mm, and preferably 4 to 7 mm, at or near the discharge point. This characteristic, as well, promotes combustion. If the piston displacement is increased, these values can be increased approximately in proportion thereto.

In many cases, the bottom of the guide groove may be substantially planar and preferably flat, inclined obliquely downward both toward the depression and also toward the longitudinal side wall of the guide groove which merges approximately tangentially with the circumferential wall of the depression and includes the first longitudinal rim. This has advantages with respect to manufacturing techniques and yet still produces very good combustion in the combustion chamber.

The intensity of the vortex of the depression may be still further increased if a concave indentation which extends in the longitudinal direction of the guide groove is provided in the bottom of the guide groove adjacent to its longitudinal side wall which merges approximately tangentially with the circumferential wall of the depression, the breadth of the concave indentation being less than half the breadth of the bottom of the guide groove.

The volume of the guide groove is suitably small. It is preferable that the volume of the guide groove which remains available at the top dead center position of the piston with respect to the valve plate is less than 12%, and preferably from 4 to 10%, of the combustion chamber volume available when the piston is in this position.

It is also a particular advantage of the invention that the inside volume of the guide groove available in the top dead center position of the piston can be still further substantially reduced by means of the particular valve plate, in that the valve plate, preferably provided, protrudes into this guide groove by preferably 1 to 2 mm in the top dead center position of the piston. As a result, the volume of the guide groove, which is already quite small, is still further reduced toward the end of the compression stroke so that the valve plate forms a compressing surface which toward the end of the compression stroke forces additional mixture or gas out of the guide groove into the depression and thus still further reduces the volume of that part of the combustion chamber located outside the depression upon combustion. This advantage is attained even while there is a still further intensification, favoring combustion, of the vortex flow.

In a preferred embodiment, the height of the longitudinal side wall of the guide groove which merges approximately tangentially with the circumferential wall of the depression increases in the direction of the depression from a minimum value to a maximum value in such a manner that the angle encompassed by the upper and the lower rim of this longitudinal side wall amounts to a maximum of 10° and preferably 3° to 6°. As a result, the cross-section of the guide groove in the downstream direction is increased in an advantageous manner and the lateral inflow of gas from the squeezing zones located at either side thereof is advantageously taken into consideration.

The maximum breadth of the guide groove may be particularly advantageously located at a distance from the piston rim, with the breadth of the guide groove preferably decreasing in the downstream direction from this point of maximum breadth, preferably by a maximum of 20%. As a result, the squeezing zone can be increased further. A large breadth of the guide groove at the rim of the piston is a useless waste of squeezing surface, and also an unnecessary increase of the volume of the guide groove available in the top dead center position. The mixture located in this guide groove burns more slowly than does that in the depression.

The spark plug may be suitably disposed opposite the depression in the cylinder head, preferably in the direction of the vortex flow in the vicinity of that end of the breakaway edge of the mouth of the guide groove which is upstream with respect to the vortex flow.

The maximum breadth of the guide groove may preferably be at that point which passes through the central longitudinal axis of the particular valve plate.

With respect to the relatively large breadth of the guide groove, it is suitable for the sector angle relative to the longitudinal axis of the depression of the mouth of the guide groove which enters into the depression to be preferably at least 70° and in particular at least 85°. Sector angles larger than 90°, and preferably from 95° to 120°, have proved to be particularly suitable.

In order that no gas flow component in a direction counter to that of the vortex flow can form about the central longitudinal axis in the depression should enter the depression from the guide groove, it is desirable that the tangent passes through the terminal area, located directly in front of the breakaway point of the flow which enters the depression from the guide groove, of the second longitudinal rim, or the particular longitudinal side wall defined thereby, of the guide groove between the central longitudinal axis of the depression and the remaining mouth of the guide groove. Preferably, said tangent can enter into the depression at an angle of 40° to 80° from the adjacent downstream rim of the bottom of the guide groove. In order thereby to provide the inflow of the gas into the depression while embodying the guide groove in a manner favorable to the flow, the second longitudinal rim of the guide groove may suitably be curved in a slightly concave fashion at least in the vicinity of the mouth of the guide groove.

In order to obtain the longest possible guide groove, it is further desirable for the depression to be at only a small distance from the circumferential wall of the piston, this distance preferably being less than 10% of the piston diameter and, in particular, being such as is still permissible on thermal grounds for the function of the piston rings, and for the guide groove to begin at that point on the piston top rim which is diametrically opposed to this point of minimum distance of the depression from the piston circumference, or to begin at only a small distance from this point on the rim.

It is preferable that a single guide groove leads to the depression. However, in many cases, a plurality of guide grooves which lead to the depression may be provided and, particularly, when more than two gas exchange valves are provided, for example, one large and one small inlet valve and one exhaust valve, or two inlet valves each and two outlet valves each.

To attain the most extensive possible expulsion of the combusted charge, it is desirable that the exhaust valve is disposed above the depression and correspondingly the inlet valve or one inlet valve is disposed above the guide groove. This has the advantage that the higher temperature of the exhaust valve plate additionally favors combustion in the depression.

It is also desirable in many cases for the guide groove to have a nonuniform depth over its breadth and to incline flatly upward from its lowermost longtitudinal area, which is suitably provided in the vicinity of the first longitudinal rim of the guide groove, toward the longitudinal side wall of the guide groove having the second longitudinal rim, or in many cases also to incline flatly up to the second longitudinal rim of the guide groove.

The breadth of the guide groove, at least from the point of its greatest breadth up to the depression, is substantially greater than its depth, and its breadth in this region is preferably not smaller than, or only relatively little smaller than, the diameter of the valve plate located opposite it. As a result there is created a large broad area surrounded by squeezing surfaces of the piston top, which is formed by the guide groove into which, toward the end of the compression stroke, gas can flow from the large squeezing surfaces and, in some cases, from the rearward rim of the guide groove as well. Because of the shallow depth of the guide groove, relatively high flow velocities occur in the gas flow or mixture flow in the guide groove toward the depression, and the sole vortex flow which has been mentioned and which rotates, always in the same rotational direction, about the longitudinal axis of the depression is securely generated in the depression, so that combustion of the fuel-air mixture occurs in optimal fashion. The fuel-air mixture may thereby already be created before the combustion chamber, either by a carburetor or through injection, or it can also be created in the combustion chamber through injection of the fuel into it, preferably into the depression.

Although it is possible, and in many cases advantageous, to form the depression as approximately circular, it is particularly advantageous for the sake of obtaining the longest possible guide groove and the largest possible squeezing surfaces at the side of the guide groove of the piston top to provide a curved circumferential wall of constant concavity in the depression, which wall has a maximum diameter in one central longitudinal plane and has a smaller diameter in a central longitudinal plane located perpendicular to the former, and that the central longitudinal plane determined by this smaller diameter passes through the mouth of the guide groove. This depression can thus, as in the other embodiment of the depression as well, always be suitable disposed as closely as possible to the rim area of the piston remote from the guide groove, as closely as the thermal load on the piston rings technically permits. The guide groove may suitably be so formed that its first longitudinal rim is the upper rim of one longitudinal side wall of the guide groove. However, it is, in many cases, also possible to embody the cross section of the guide groove such that there is no "longitudinal side wall" as such, in that the groove has a constant flat concave curve from one longitudinal rim to the other.

It is particularly suitable to form the bottom of the depression as approximately flat and/or oblique and the circumferential wall of the depression as slightly conical. The circumferential wall of the depression can suitably merge via a curved portion with the bottom.

In order for the guide groove to be as long as possible, it is desirable for it to begin at the rim of the piston or at a small distance therefrom, preferably less than 5 mm. The length of the guide groove may suitably be at least 0.25 times the piston diameter and preferably about 0.3 to 0.5 times the piston diameter.

As has already been mentioned, it is desirable for the longitudinal rims of the guide groove to be adjacent to squeezing surfaces of the piston top. These squeezing surfaces may suitably extend up to the piston rim, i.e., they are not recessed. Depending on the form of the piston top, they may be flat or slightly curved.

In a preferred embodiment, the breadth of the guide groove at its mouth is at least 4 times larger, and preferably at least 6 times larger, than its average depth at this mouth. Furthermore the depth of the depression can be preferably at least 3 times larger, and preferably approximately 3.5 to 5 times larger, than the average depth of the guide groove at its mouth. As a result, good combustion levels are attained. The intensity of the vortex flow which arises in the depression toward the end of the compression stroke can be still further increased in that the depth of the guide groove increases transversely to its longitudinal direction in the direction of its longitudinal side wall which merges approximately tangentially with the circumferential wall of the depression.

The invention will be better understood and further objects and advantages thereof become more apparent from the ensuing detailed description of preferred exemplary embodiments taken in conjunction with the drawings.

BRIEF DESCRIPTION OF THE DRAWINGS

FIG. 1 is a plan view of the top of a piston constructed in with the invention wherein areas of the associated cylinder head which are located above the plane of the drawing are indicated by dot-dash lines;

FIG. 2 is a sectional view taken through FIG. 1 along the line 2—2;

DESCRIPTION OF THE PREFERRED EMBODIMENTS

Figure 3:
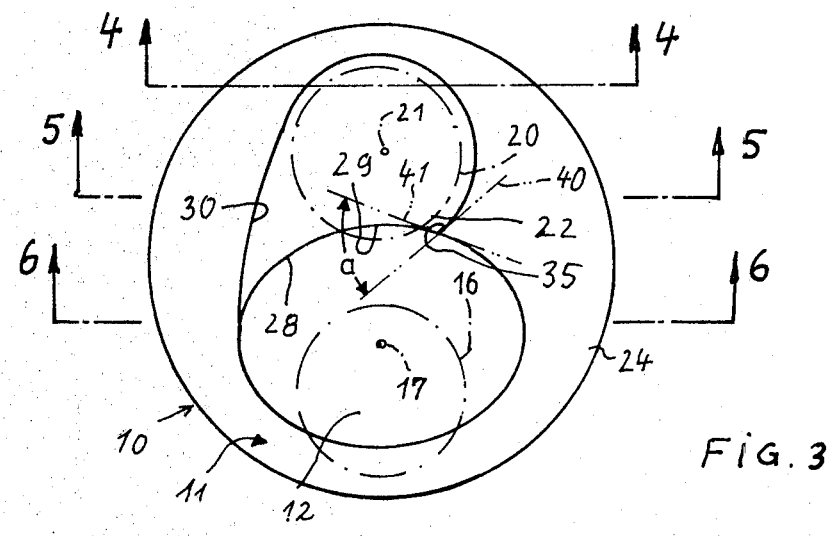
FIG. 3 is a plan view of a piston constructed in accordance with a second embodiment of the invention.

In FIGS. 1 and 2, the piston 10 of an externally ignited, four-cycle internal combustion engine (that is, a Otto engine) which is known in other respects is shown in a top plan view and with schematic cross-section of critical portions of the piston and valves. A circular depression 12 is formed by casting and machining in the piston top 11 and has a circumferential wall which tapers slightly toward the bottom 13, as shown in the cross-sectional view in FIG. 2. The bottom 13, which merges via a curve with the circumferential wall of this depression 12, is flat. The rim area on the left-hand side of this depression 12 (as viewed in FIG. 2) is located at a slight distance from the circumference of the piston 10, this distance being determined as the thermal load of the piston rings 14 permits.

The crescent-shaped flat indentation 15 in the left-hand rim area of the depression 12 is intended only for the purpose so that the plate 16 of the overhead valve located above this depression 12, which in this preferred embodiment is the exposed working face of the exhaust valve, cannot strike the piston top 11. This crescent-shaped indentation 15 thus does not comprise a guide groove in the sense of the invention. The central longitudinal axis 17 of the depression 12 is therefore arranged at a predetermined spaced distance from the central longitudinal axis 18 of the piston 10, the two axes 17 and 18 being parallel to one another. The longitudinal axis 19 of the exhaust valve plate 16 is thus located vertically above the depression 12.

The other gas exchange valve of this cylinder, the valve plate of which is indicated by reference numeral 20 and the longitudinal axis of which is indicated by reference numeral 21 in FIG. 2, is therefore preferably the valve plate of the inlet valve. This valve plate 20 is located vertically above a guide groove 22 which is flat and broad and which, in accordance with FIG. 1, has a semicircular rearward rim area 23 with a radius which is somewhat larger than the radius of the inlet valve plate 20. The longitudinal axis 21 of the valve plate 20 passes through the center of curvature of this semicircular rim area 23, so that the inlet valve plate 20 can protrude into this guide groove 22 when, during the suction stroke, it opens the gas inlet of this cylinder which is below it. This semicircular rim area 23 is disposed at only a slight distance from the adjacent rim area of the piston top 11 so as to attain the best possible balance between the greatest possible length for the guide groove 22 and the greatest possible surface area for the squeezing surface 24 of the piston top 11. In fact, the entire surface 24 of the piston top, which, in this illustrated embodiment is smooth and which includes the depression 12, the crescent-shaped indentation 15 and the guide groove 22, forms one single, uninterrupted squeezing surface 24, so that a further, narrow squeezing surface area is also located between the guide groove 22 and the closest rim area thereto of the piston 10. This is particularly favorable. At either longitudinal side of the guide groove 22, in contrast, there are broad squeezing areas.

The guide groove 22 is extended adjacent to the semicircular rim area 23 up to the depression 12, wherein, in this illustrated embodiment, the guide groove 22 has an approximately constant breadth from the cross-sectional plane 32, through which the central longitudinal axis 21 of the inlet valve plate 20 passes, up to the beginning of the depression 12, i.e., up to the cross-sectional plane 25. The two longitudinal rims 26, 27 of this guide groove 22 adjacent to the semicircular rim area 23 take the substantially straight and mutually parallel course indicated in FIG. 1. The longer and first longitudinal rim 26, which limits the longitudinal side wall of the guide groove 22 at the top, merges approximately tangentially, like this longitudinal side wall 30 as well, with the circumferential wall of the depression 12. The other longitudinal side wall 35, which is much shorter and limited at the top by the second longitudinal rim 27, discharges into the depression 12 at an angle of approximately 90°.

The rim of the mouth 28 of the guide groove 22 which leads into the depression 12 forms a breakaway edge 29 beginning at the second longitudinal rim 27 and thus, extends up to the longitudinal side wall 30, because the side wall 30 merges approximately tangentially with the circumferential wall of the depression 12. The sector angle of the mouth 28 relative to the central longitudinal axis 17 of the depression 12 is somewhat larger than 90°. The depth of the guide groove 22 of FIG. 2 is not great and is substantially less than the depth of the depression 12.

As shown, the depth of the depression 12 is less than its diameter, which is particularly desirable. The depth of the guide groove 22 in this illustrated embodiment is, at maximum, approximately one-third the depth of the depression 12. However, the average depth of the guide groove 22 is still substantially smaller, because its maximum depth at the mouth 28 occurs in a concave, narrow longitudinal inward curve 31 of the guide groove 22. This narrow, concave inward curve 31 is adjacent to the longitudinal side wall 30 and extends approximately up to the cross-sectional plane 32. The remaining bottom of the guide groove 22 is approximately flat and slightly inclined downward in the direction of the depression 12.

In the cylinder head 38 there is also provided an opening 33 for a spark plug and, if needed, an opening 34 as well for a fuel injection nozzle.

The four-cycle internal combustion engine having at least one cylinder with a piston such as piston 10 functions as follows. During the suction stroke, fresh gas is induced, which may already contain the fuel, or the fuel is injected into the combustion chamber. During the compression stroke, the gas or the mixture is highly compressed and shortly before the end of the compression stroke the squeezing surfaces 24 of the piston 10 and cylinder head 38, as a result of the rapidly decreasing, small distance between them, force gas or mixture elements into the guide groove 22 them, force gas or mixture elements into the guide groove 22 from behind and from their sides, as a result of which a characteristic gas flow appears in the guide groove 22 and advances toward the depression 12. This gas flow enters the depression 12 approximately tangentially and is thereby detached at the breakaway edge 29 and sets the gas or the mixture into a single vortex flow which rotates in the direction of the arrow A about the central longitudinal axis of the depression 12. The squeezing surfaces 24 can thereby also squeeze some of the gas located between them out of the mouth 28 of the guide groove 22 approximately radially into the depression 12. However, this air component is small because of the relatively small squeezing zone areas in this location and, as a result, it cannot impair the establishment of the vortex flow because of the great breadth and relatively great length of the guide groove 22.

Then, as is conventional, ignition occurs, the spark plug being located above the depression 12, and an extraordinarily rapid combustion of the fuel-air mixture then takes place in the depression 12. Furthermore, because the inlet valve plate 20, if it is not disposed in a corresponding indentation in the cylinder head 38, travels downwardly toward the end of the compression stroke into the guide groove 22 and extends almost completely across the surface of the guide groove 22, it likewise forces some of the gas located in the guide groove 22 into the depression 12. As a result, the vortex flow is still further reinforced and the mixture volume located outside the depression 12 at the instant of ignition of the mixture is still further reduced, so that the entire combustion takes place extremely quickly and intensively, and highly complete combustion is attained, with all the attendant advantages.

Also, very high compressions of the mixture can be applied and the engine can operate with a high air excess coefficient on the part of the mixture.

Figure 4:
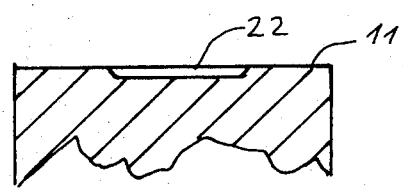
FIG. 4 is a sectional view taken substantially along line 4—4 of FIG. 3 in the direction of the arrows.
Figure 5:
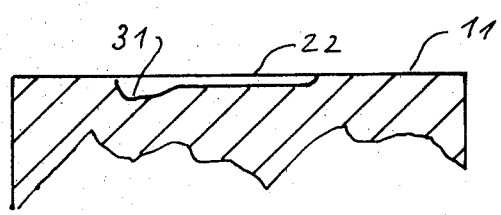
FIG. 5 is a sectional view taken substantially along line 5—5 of FIG. 3 in the direction of the arrows.
Figure 6:
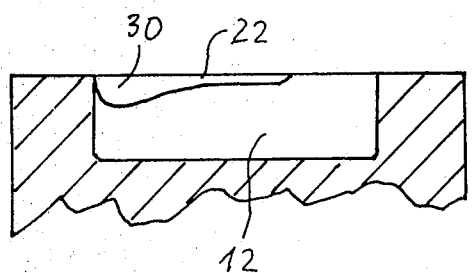
FIG. 6 is a sectional view taken substantially along line 6—6 of FIG. 3 in the direction of the arrows.

The embodiment in accordance with FIGS. 3-6 differs from that of FIGS. 1 and 2 primarily in that the depression 12 has an oval cross section and the longitudinal side wall 30 of the guide groove 22 which merges approximately tangentially with this depression, is curved in slightly concave fashion. Furthermore, the other longitudinal side wall 35 of this guide groove 22 proceeds at a narrower angle a of about 60° to the adjacent area of the bottom of the mount 28 of the guide groove 22. In fact, this angle a is the angle between the tangent 40 to the downstream end of the longitudinal side wall 35 and the mouth area, adjacent to this tangent 40, of the bottom of the guide groove 22, that is, its tangent 41. The cross-sectional course of the guide groove 22 can be derived from FIGS. 4-6.

The depression 12 is disposed in such a fashion that its minimum diameter is pointed approximately at the central longitudinal axis 21 of the valve plate 20 located above the guide groove 22, which is particularly advantageous. The guide groove 22 and the depression 12 are again at only slight distances from the particular adjacent rim areas of the piston top 11 of the piston 10.

In both illustrated embodiments, the central longitudinal axis 17 of the depression 12 passes virtually through the connecting line between the centers of the end faces of the valve plates 16 and 20.

In FIG. 1, the suction channel which discharges into the cylinder combustion chamber is indicated by reference numeral 37. This suction channel 37 is formed such that during the suction stroke gas which flows into the cylinder interior rotates therein in the direction of the arrow B, that is, in the same direction as the vortex flow being established in the depression 12 (arrow A).

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. An externally ignited, four-cycle internal combustion engine comprising a gas supply channel having an inlet valve, at least one cylinder having a head, a piston in said cylinder having a top defining with said cylinder a combustion chamber, overhead gas exchange valves having plates provided with end faces, said piston top being provided with a depression having a guide groove provided with a mouth communicating therewith, vortex producing means including a circumferential wall with said mouth in which a vortex flow of gas and air mixture to be combusted is generated rotating in a path approximately parallel to said piston top, the volume of said combustion chamber available in the top dead center position of said piston is primarily embodied by said depression in said piston top, the central longitudinal axis of said depression being provided at a distance from the longitudinal axis of said piston approximately parallel to it, the central longitudinally axis of said depression being disposed at a location between the vicinity of a connecting line of the centers of the end faces on the combustion chamber side of said valve plates within a distance from this connecting line of less than 10% of the diameter of said piston and said longitudinal axis of said depression being at a smaller or no distance from the center of one valve front face than from the center of the other valve front face, one valve front face being located at least substantially above and respectively opposite said depressions, an indentation being provided in said piston top opposite said other valve plate, said indentation having at least the diameter of said valve plate and into which the valve plate protrudes in the top dead center position of said piston, and said indentation in the top of the piston and in the cylinder head including said other valve plate being extended toward a broad and flat guide groove leading approximately tangentially into said depression of said piston, so that the vortex flow rotating in a path approximately parallel to said piston top about the central longitudinal axis of said depression is be effected by means of the gas and air mixture flowing out of said guide groove into said depression toward the end of the compression stroke, and that the average depth of said guide groove at its discharge point is substantially smaller than the depth of said depression.

2. An engine in accordance with claim 1, wherein said guide groove includes a first longitudinal rim and a second longitudinal rim, the first rim which is downstream relative to the vortex flow in said depression from the second rim leads approximately tangentially to said circumferential wall of said depression, said first and said second rim being adjacent to the squeezing surfaces of said cylinder head and said piston.

3. An engine in accordance with claim 1, said piston being equipped with piston rings and wherein in said depression is at a distance from the circumference of said piston which distance is a function of the magnitude of the thermal load on said piston rings.

4. An engine in accordance with claim 1, wherein said depression is approximately circular.

5. An engine in accordance with claim 1, wherein said depression has a constantly concave curved circumferential wall, which in a central longitudinal plane has a maximum diameter and in a central longitudinal plane perpendicular thereto has a smaller diameter and that the central longitudinal plane determined by this smaller diameter passes through the mouth of said guide groove.

6. An engine in accordance with claim 1, wherein said guide groove includes at least one longitudinal side wall and wherein said first longitudinal rim and said second longitudinal rim of said guide groove are respectively the upper rim of one longitudinal side wall of said guide groove.

7. An engine in accordance with claim 1, wherein the bottom of said depression is approximately flat and said circumferential wall of said depression is slightly conical and merges via a curve with the bottom of said depression.

8. An engine in accordance with claim 1, wherein said guide groove begins at the rim of said piston or at a small distance less than 5 mm therefrom.

9. An engine in accordance with claim 1, wherein the length of said guide groove is within the range of between 0.25 and 0.5 times the diameter of said piston.

10. An engine in accordance with claim 2, wherein the longitudinal rims of said guide groove and said depression as well are adjacent to squeezing surfaces of said piston top, which squeezing surfaces extend up to the rim of said piston and wherein said guide groove and said depression are located within a single squeezing surface.

11. An engine in accordance with claim 1, wherein the breadth of said guide groove at its mouth is between four times larger and six times larger than its average depth at the mouth and that the depth of the depression is within the range of approximately 3.5 to 5 times greater than the average depth of said guide groove at its mouth.

12. An engine in accordance with claim 6, wherein the depth of said guide groove increases transversely to its longitudinal direction in the direction of said longitudinal side wall merging approximately tangentially with said circumferential wall of said depression.

13. An engine in accordance with claim 6, wherein the height of said longitudinal side wall of said guide groove which has the first longitudinal rim increases in the direction of said depression from a minimum to a maximum value in such a fashion that the angle enclosed between the upper and the lower rim of said longitudinal side wall is within the range of between 3° to 10°.

14. An engine in accordance with claim 1, wherein the maximum breadth of said guide groove is located at a distance from the rim of said piston and that the breadth of said guide groove is reduced in the downstream direction from this point of maximum breadth by a maximum of 20%.

15. An engine in accordance with claim 1, wherein the sector angle of the mouth of said guide groove leading into said depression is within the range of 70° to 85° relative to the longitudinal axis of said depression.

16. An engine in accordance with claim 1, wherein the sector angle of the mouth of said guide groove leading into said depression is within the range of between 90° to 120°.

17. An engine in accordance with claim 6, wherein said one longitudinal side wall of said guide groove merges approximately tangentially with said circumferential wall of said depression, and that the remaining rim of said mouth of said guide groove is formed in said depression as a breakaway edge.

18. An engine in accordance with claim 2, wherein the tangent to the end area of the second longitudinal rim and the pertinent longitudinal side wall of said guide groove located directly before the breakaway point of the flow entering said depression from said guide groove passes between the central longitudinal axis of said depression and the remaining mouth of said guide groove.

19. An engine in accordance with claim 18, wherein said tangent enters into said depression at an angle (a) of between 40° to 80° from the adjacent downstream rim of the bottom of said guide groove.

20. An engine in accordance with claim 1, wherein said depression has only a small distance, less than 10% of the diameter of said piston, from the circumferential wall of said piston and at a distance such as is still permissible on thermal grounds for the functioning of the rings of said piston and that said guide groove begins at the rim zone of said piston top diametrically opposite this zone of minimum distance of said depression from the circumference of said piston or only a small distance from this rim zone.

21. An engine in accordance with claim 1, wherein a single guide groove leads to said depression which is disposed in said piston top.

22. An engine in accordance with claim 2, wherein the longitudinal side wall of said guide groove having the first longitudinal rim merges approximately tangentially with the circumferential wall of said depression and that said guide groove, from its deepest longitudinal area, which is located in the vicinity of this longitudinal side wall, inclines flatly up to a second longitudinal side wall of said guide groove having the second longitudinal rim or flatly up to the second longitudinal rim of said guide groove.

23. An engine in accordance with claim 1, in which said gas supply channel leading into said cylinder, which channel can be closed off by said inlet valve, leads to said combustion chamber of said at least one cylinder in such a fashion that the gas flow through it into said combustion chamber rotates as a vortex flow in said at least one cylinder about its longitudinal axis, the vortex direction of the gas flow in said depression effected by the gas overflowing from said guide groove into said depression being in the same direction as the first-named vortex flow.

24. An engine in accordance with claim 1, wherein the cross section of said guide groove in that longitudinal section which begins at the cross-sectional plane determined by the central longitudinal axis of said valve plate located above it and extends up to said depression changes little in the direction of the depression and enlarges only within the range up to 30% relative the cross section in the plane determined by the central longitudinal axis of said gas exchange valve.

25. An engine in accordance with claim 1, wherein the displacement of said at least one cylinder amounts to 200 to 700 cm$^3$, the depth of said guide groove below said valve plate located above it being within the range of between 1 mm to 4 mm, and when the displacement is larger this amount increases approximately in proportion thereto.

26. An engine in accordance with claim 25, wherein the maximum depth of said guide groove increases in the downstream direction near the mouth within the range of between 3 mm to 7 mm, with this amount as well and if the displacement is larger, increasing approximately in proportion thereto.

27. An engine in accordance with claim 1, wherein said gas exchange valve located above the guide groove is said inlet valve, and where there is a plurality of said inlet valves, said inlet valve located above the guide groove has the largest valve plate diameter.

28. An engine in accordance with claim 2, wherein the bottom of said guide groove is substantially flat and is inclined, flatly and obliquely downward both toward said depression and toward said longitudinal side wall having said first longitudinal rim.

29. An engine in accordance with claim 6, including a concave indentation extending in the longitudinal direction of said guide groove in the bottom of said guide groove adjacent to its longitudinal side wall having said first longitudinal rim and merging approximately tangentially with said circumferential wall of said depression, the breadth of this indentation being smaller than half the breadth of the bottom of said guide groove.

30. An engine in accordance with claim 1, wherein the volume of said depression in said piston top amounts to within the range of between 60% and 80% of the available combustion chamber volume in the top dead center position of said piston and that the depth of said depression is smaller than its maximum diameter.

31. An engine in accordance with claim 1, wherein the volume of said guide groove left available by the particular valve plate in the top dead center position of said piston is within the range of between 4% to 12% of the combustion chamber volume available in this piston position.

32. An engine in accordance with claim 1, wherein said valve plate located above said guide groove is protruding in its closed position, over said cylinder head and, in this position, in the top dead center position of said piston, intrudes into said guide groove.

33. A method for driving an externally ignited, four cycle, internal combustion engine, said engine having a gas supply channel having an inlet valve, at least one cylinder having a head, a piston in said cylinder having a top defining with said cylinder a combustion chamber and overhead gas exchange valves having valve plates provided with end faces, said piston top being provided with a depression having a guide groove provided with a mouth communicating therewith and a circumferential wall in which a vortex flow of the mixture to be combusted is be generated rotating in a path appoximately parallel to said piston top, wherein in the top dead center position of said piston, the volume of said combustion chamber then available is primarily embodied by said depression in said piston top, and wherein the central longitudinal axis of said depression is provided at a distance from the longitudinal axis of said piston and approximately parallel to it, that the central longitudinal axis of said depression is disposed at a location between the vincinity of a connecting line of the centers of the end faces on the combustion chamber side of said valve plates within a distance from this connecting line of less than 10% of the diameter of said piston and said longitudinal axis of said depression being at a smaller or no distance from the center of one valve front face than from the center of the other valve front face, so that one valve front face is located at least substantially above and respectively opposite said depression, that an indentation is provided in said piston top opposite said other valve plate, which indentation has at least the diameter of said valve plate and into which the valve plate protrudes in the top dead center position of said piston, and that indentation in the top of the piston and in the cylinder head which includes said other valve plate is extended toward a broad and flat guide groove leading approximately tangentially into said depression of said piston, so that the vortex flow rotating approximately parallel to said piston top about the central longitudinal axis of said depression is generated by means of gas and air mixture flowing out of said guide groove into said depression toward the end of the compression stroke, and that the average depth of said guide groove at its discharge point is substantially smaller than the depth of said depression, the method comprising the steps of:

providing a fuel and air mixture to the engine which has an air excess of 10% to 40% ($\lambda = 1.1$ to 1.4).

34. The method as defined in claim 33, wherein the air excess provided is between 20% to 30% ($\lambda = 1.2$ to 1.3).

* * * * *